(12) United States Patent
Ihara et al.

(10) Patent No.: US 10,719,543 B2
(45) Date of Patent: Jul. 21, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Keigo Ihara, Tokyo (JP); Atsushi Shionozaki, Tokyo (JP); Yasushi Miyajima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 239 days.

(21) Appl. No.: 15/738,899

(22) PCT Filed: May 17, 2016

(86) PCT No.: PCT/JP2016/064637
§ 371 (c)(1),
(2) Date: Dec. 21, 2017

(87) PCT Pub. No.: WO2017/026154
PCT Pub. Date: Feb. 16, 2017

(65) Prior Publication Data
US 2018/0173704 A1 Jun. 21, 2018

(30) Foreign Application Priority Data
Aug. 11, 2015 (JP) ................................. 2015-158707

(51) Int. Cl.
*G06F 16/432* (2019.01)
*G06F 16/48* (2019.01)
(Continued)

(52) U.S. Cl.
CPC .......... *G06F 16/434* (2019.01); *G06F 16/489* (2019.01); *G06F 16/78* (2019.01);
(Continued)

(58) Field of Classification Search
USPC .................................. 707/769; 382/103, 224
See application file for complete search history.

(56) References Cited

U.S. PATENT DOCUMENTS

| 2007/0003146 A1* | 1/2007 | Ko ................. G08B 13/19641 382/224 |
| 2007/0053571 A1 | 3/2007 | Hayashi |

(Continued)

FOREIGN PATENT DOCUMENTS

| JP | 2002-41703 A | 2/2002 |
| JP | 2002-41703 A5 | 2/2002 |

(Continued)

OTHER PUBLICATIONS

International Search Report dated Aug. 9, 2016, in PCT/JP2016/064637 filed May 17, 2016.

*Primary Examiner* — Hung T Vy
(74) *Attorney, Agent, or Firm* — Xensus LLP

(57) ABSTRACT

[Object] To easily search a plurality of captured images for a captured image in which a subject to be imaged that has once appeared in a captured image appears again is desired. [Solution] An information processing apparatus according to the present disclosure includes: a reading unit configured to read, from a recording unit configured to record radio wave information concerning a radio wave, a captured image, and a time at which the captured image is taken in correlation with one another, the radio wave information; and a searching unit configured to search a plurality of the captured images recorded in the recording unit for a captured image that satisfies a search condition on a basis of at least one of a number of radio waves included in the read radio wave information and an intensity of the radio waves.

13 Claims, 15 Drawing Sheets

(51) Int. Cl.
*H04N 7/18* (2006.01)
*G06F 16/78* (2019.01)
*G06F 16/783* (2019.01)

(52) U.S. Cl.
CPC ............. *G06F 16/784* (2019.01); *H04N 7/18* (2013.01); *H04N 7/181* (2013.01)

(56) References Cited

U.S. PATENT DOCUMENTS

| | | | |
|---|---|---|---|
| 2007/0276540 A1* | 11/2007 | Okuda | G05D 1/0272 |
| | | | 700/245 |
| 2008/0195637 A1 | 8/2008 | Anegawa et al. | |
| 2011/0066667 A1 | 3/2011 | Peeters et al. | |
| 2014/0205144 A1* | 7/2014 | Inada | G06K 9/00791 |
| | | | 382/103 |

FOREIGN PATENT DOCUMENTS

| | | |
|---|---|---|
| JP | 2006-217336 A | 8/2006 |
| JP | 2007-52646 A | 3/2007 |
| JP | 2011-523126 A | 8/2011 |

* cited by examiner

FIG. 4

ASSOCIATION DB

| SURVEILLANCE CAMERA ID | CORRESPONDING RADIO WAVE MONITOR NODE ID |
|---|---|
| AAAA | 1111 |
| BBBB | 2222 |
| CCCC | 3333 |
| ⋮ | ⋮ |

FIG. 5

CAPTURED IMAGE DB

| CAPTURED IMAGE DATA | SURVEILLANCE CAMERA ID | TIME STAMP | · · · · |
|---|---|---|---|
| DATA 1 | AAAA | 2015.5.1 00:00:00 | · · · · |
| DATA 2 | BBBB | 2015.5.1 00:00:00 | · · · · |
| DATA 3 | CCCC | 2015.5.1 00:00:00 | · · · · |
| DATA 4 | AAAA | 2015.5.1 00:05:00 | · · · · |
| ⋮ | ⋮ | ⋮ | · · · · |

FIG. 6

RADIO WAVE INFORMATION DB

| RADIO WAVE INFORMATION DATA | RADIO WAVE MONITOR NODE ID | TIME STAMP | . . . . |
|---|---|---|---|
| DATA 1 | 1111 | 2015.5.1 00:00:00 | . . . . |
| DATA 2 | 2222 | 2015.5.1 00:00:00 | . . . . |
| DATA 3 | 3333 | 2015.5.1 00:00:00 | . . . . |
| DATA 4 | 1111 | 2015.5.1 00:05:00 | . . . . |
| ⋮ | ⋮ | ⋮ | . . . . |

FIG. 7

| RADIO WAVE INFORMATION | | |
|---|---|---|
| RADIO WAVE 1 | MAC ADDRESS | |
| | ELECTRIC FIELD INTENSITY | |
| | ⋮ | |
| RADIO WAVE 2 | MAC ADDRESS | |
| | ELECTRIC FIELD INTENSITY | |
| | ⋮ | |
| ⋮ | | |

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

There is a service of taking a commemorative picture in which a visitor at a facility appears and providing the picture for the visitor, such as a service of taking a commemorative picture in a recreational facility, for example. In such a service, in order to easily associate many visitors and many commemorative pictures having been taken, a technology for issuing electronic tags for visitors in advance and performing association with generated pictures utilizing the electronic tags has been proposed (see Patent Literature 1 below, for example).

CITATION LIST

Patent Literature

Patent Literature 1: JP 2002-41703A

DISCLOSURE OF INVENTION

Technical Problem

However, the technology disclosed in Patent Literature 1 above is a technology which is effective because the electronic tags have been issued in advance for persons (that is, visitors) which may appear in pictures. For example, in such a situation where an image in which any person (such as a suspicious person, for example) appears is to be found from records of a vast number of captured images taken by an imaging device such as a surveillance camera, it is not possible to use a technology as disclosed in Patent Literature 1 above.

Thus, colossal efforts are required to, using one or more persons who have once appeared in a certain captured image as a search target, find a captured image in which the same persons appear again from records of a vast number of captured images generated by an imaging device such as a surveillance camera.

When carrying out a search for a captured image as described above, it is considered to search for a desired captured image by image analysis processing utilizing an image of a person to be a search target. However, even in a case of using image analysis processing, an analysis rate may be decreased depending on an image utilized, resulting in a failure to appropriately extract a desired image.

Thus, a technology capable of easily searching a plurality of captured images for a captured image in which a person having once appeared in a captured image appears again is desired.

Therefore, the present disclosure proposes an information processing apparatus an information processing method, and a program capable of easily searching a plurality of captured images for a captured image in which a subject to be imaged that has once appeared in a captured image appears again.

Solution to Problem

According to the present disclosure, there is provided an information processing apparatus including: a storage unit in which a captured image generated by an imaging device installed at a predetermined position and radio wave information concerning a radio wave detected by a communication appliance associated with the imaging device in advance, the radio wave information being emitted from the communication appliance, are each recorded in correlation with a time stamp: a searching unit that, using at least one of an intensity and number of the detected radio waves as a search condition, searches a plurality of the captured images recorded in the storage unit for the captured image in accordance with the search condition, and a display control unit that performs display control for causing the captured image found by the searching unit to be displayed on a display screen. The radio waves include a radio wave emitted from an electronic appliance or a communication appliance held by or included in a subject to be imaged that is positioned in a field of view of the imaging device.

Further, according to the present disclosure, there is provided an information processing method including: recording a captured image generated by an imaging device installed at a predetermined position and radio wave information concerning a radio wave detected by a communication appliance associated with the imaging device in advance, the radio wave information being emitted from the communication appliance, in correlation with a time stamp; using at least one of an intensity and number of the detected radio waves as a search condition; searching a plurality of the recorded captured images for the captured image in accordance with the search condition; and performing display control for causing the found captured image to be displayed on a display screen. The radio waves include a radio wave emitted from an electronic appliance or a communication appliance held by or included in a subject to be imaged that is positioned in a field of view of the imaging device.

Further, according to the present disclosure, there is provided a program for causing a computer to implement; a storage function of recording a captured image generated by an imaging device installed at a predetermined position and radio wave information concerning a radio wave detected by a communication appliance associated with the imaging device in advance, the radio wave information being emitted from the communication appliance, in correlation with a time stamp; a searching function of, using at least one of an intensity and number of the detected radio waves as a search condition, searching a plurality of the recorded captured images for the captured image in accordance with the search condition; and a display control function of performing display control for causing the captured image found by the searching function to be displayed on a display screen. The radio waves include a radio wave emitted from an electronic appliance or a communication appliance held by or included in a subject to be imaged that is positioned in a field of view of the imaging device.

According to the present disclosure, paying attention to radio waves emitted from an electronic appliance or a communication appliance held by or included in a subject to be imaged that is positioned in a field of view of an imaging device, a captured image generated by the imaging device installed at a predetermined position and radio wave information concerning a radio wave detected a communication appliance associated with the imaging device in advance, the radio wave information being emitted from the communication appliance, are each recorded in correlation with a time stamp, and using at least one of an intensity and number of the detected radio waves as a search condition, a plurality of the recorded captured images are searched for a captured image in accordance with the search condition, and display control for causing the found captured image to be displayed on a display screen is performed.

Advantageous Effects of Invention

As described above, according to the present disclosure, it is possible to easily search a plurality of captured images for a captured image in which a subject to be imaged that has once appeared in a captured image appears again.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is an explanatory diagram showing an example of a data structure of data stored in a storage unit of the information processing apparatus according to the embodiment.

FIG. 5 is an explanatory diagram showing an example of a data structure of data stored in a storage unit of the information processing apparatus according to the embodiment.

FIG. 6 is an explanatory diagram showing an example of a data structure of data stored in a storage unit of the information processing apparatus according to the embodiment.

FIG. 7 is an explanatory diagram showing an example of a data structure of data stored in a storage unit of the information processing apparatus according to the embodiment.

MODE(S) FOR CARRYING OUT THE INVENTION

Figure 1:
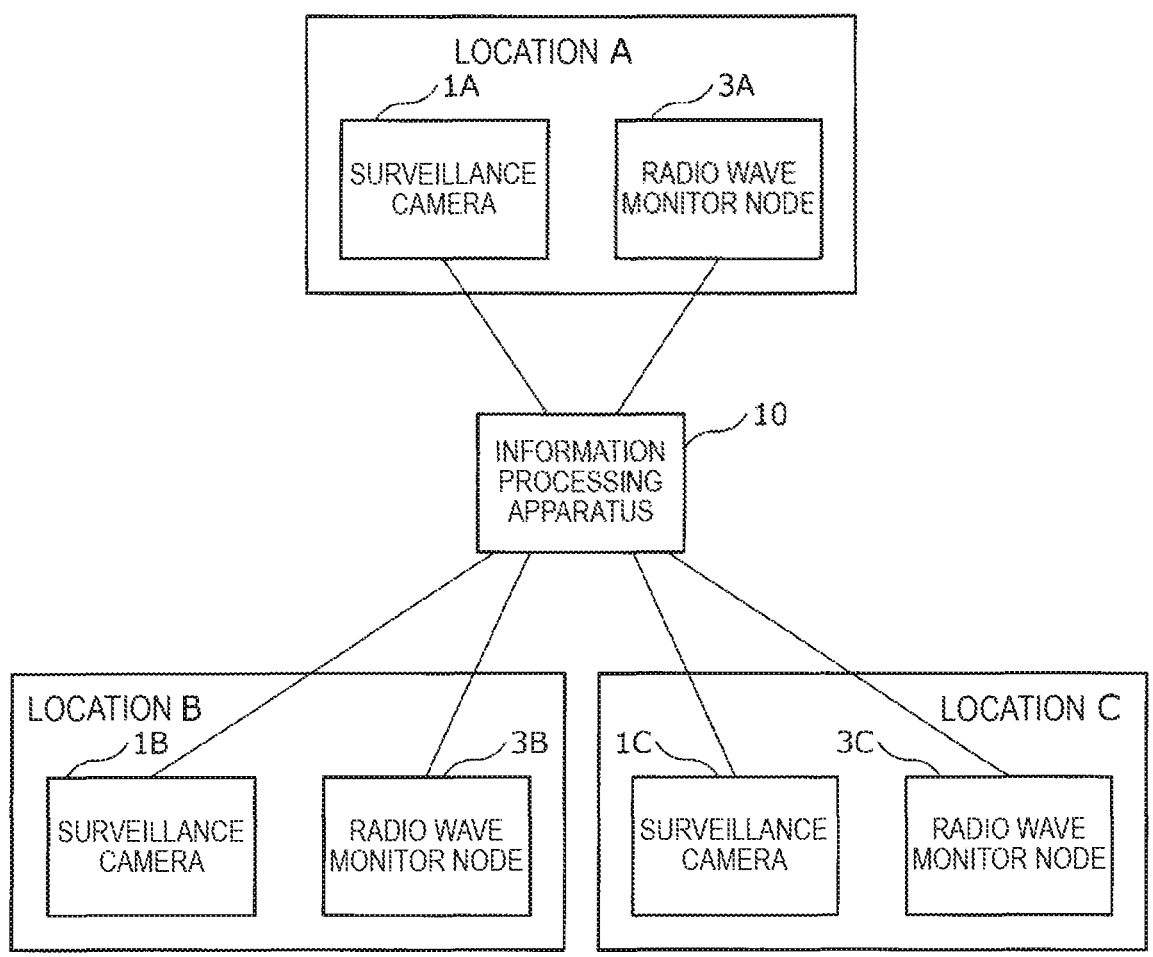
FIG. 1 is an explanatory diagram for describing an information processing apparatus according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be now provided in the following order.
1. First Embodiment
1.1. Regarding Information Processing Apparatus
1.1.1. Regarding Relationship Between Information Processing Apparatus and Another Appliance
1.1.2. Regarding Configuration of Information Processing Apparatus
1.1.3. Regarding Details of Captured Image Searching Processing and Examples of Display Screen
1.2. Regarding Information Processing Method
2. Regarding Hardware Configuration First Embodiment <Regarding Information Processing Apparatus>
[Regarding Relationship Between Information Processing Apparatus and Another Appliance]

Figure 2:
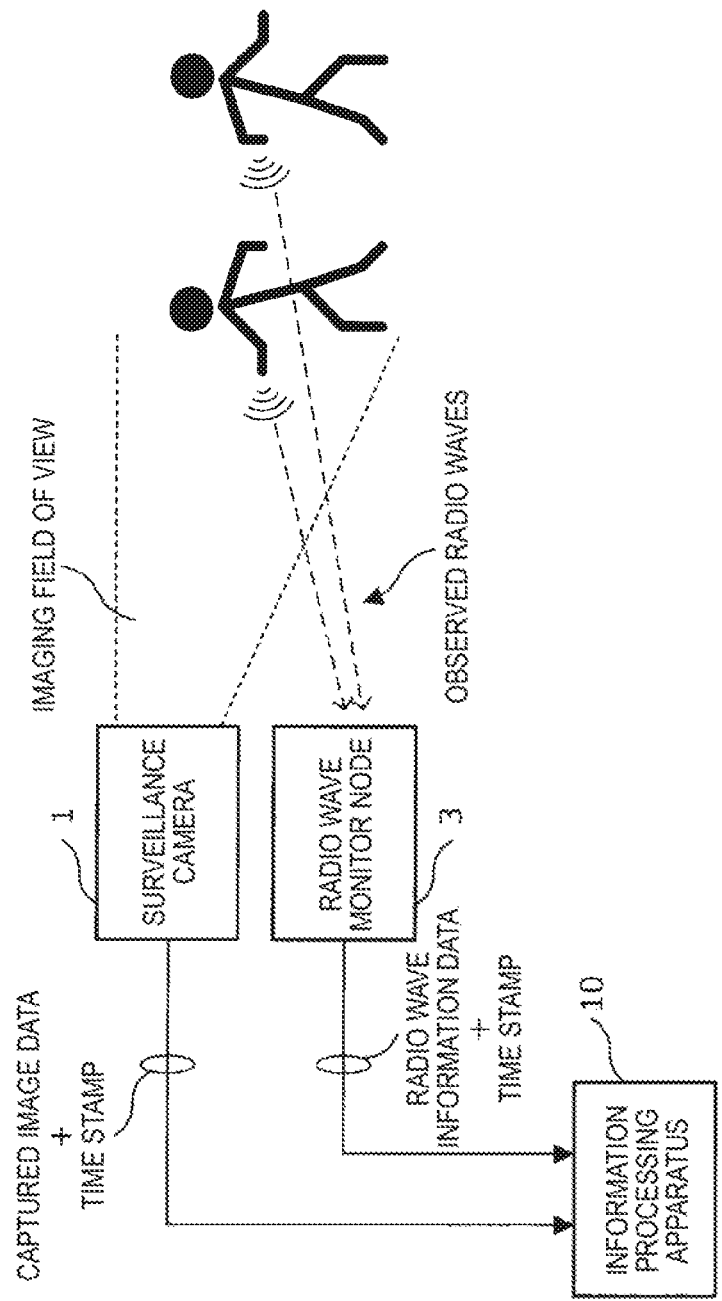
FIG. 2 is an explanatory diagram for describing the information processing apparatus according to the embodiment.

First, with reference to FIG. 3 and FIG. 2, an information processing apparatus according to a first embodiment of the present disclosure will be described in detail focusing on a relationship with another appliance. FIG. 1 and FIG. 2 are explanatory diagrams for describing the information processing apparatus according to the present embodiment.

An information processing apparatus 10 according to the present embodiment is an apparatus that stores a captured image taken by a surveillance camera 1 provided at any location and stores radio wave information sent from a radio wave monitor node 3 associated with the surveillance camera, as will be described below in detail. Here, radio wave information sent from the radio wave monitor node 3 includes various types of information concerning various radio waves (for example, radio waves for use in various types of wireless communication including wireless LAN communication or the like, such as Wi-Fi or Bluetooth (registered trademark)) observed by the radio wave monitor node 3. In addition, the information processing apparatus 10 according to the present embodiment has functions of reproducing any stored captured image in accordance with a user operation and searching a plurality of stored captured images for a captured image that matches a search condition.

The in formation processing apparatus 10 having functions as described above acquires image data concerning respective captured images generated by surveillance cameras 1A, 1B, and 1C installed at any locations (a location A, a location B, and a location C in FIG. 1, for examples, and stores the acquired image data in various storage devices provided inside the information processing apparatus 10 or outside the information processing apparatus as schematically shown in FIG. 1. The information processing apparatus 10 also acquires radio wave information concerning radio waves observed by radio wave monitor nodes 3A, 3B, and 3C installed at the location A, the location B, and the location C, and stores the acquired radio wave information in various storage devices provided inside the information processing apparatus 10 or outside the information processing apparatus 10.

Note that FIG. 1 illustrates a case where each of the number of surveillance cameras 1 and the number of radio wave monitor nodes 3 capable of mutually communicating with the information processing apparatus 10 is three, whilst it is needless to say that the number of the surveillance cameras 1 and the number of the radio wave monitor nodes 3 capable of mutually communicating with the information processing apparatus 10 may each be one or two, or may each be four or more.

Here, as schematically shown in FIG. 2, the surveillance camera 1 provided at any location is an example of an imaging device that images various subjects to be imaged that are positioned an imaging field of view, and is an appliance that can generate a still image or a moving image concerning a subject to be imaged. The surveillance camera 1 is not particularly limited, but various imaging devices can be utilized as necessary. In addition, the radio wave monitor node 3 provided at any location is a device that observes various radio waves existing around the radio wave monitor node 3, and generates radio wave information concerning the observed radio waves. This radio wave monitor node is also not particularly limited but various radio wave monitoring devices that can acquire specific identification information, such as a wireless LAN monitor node, can be utilized as necessary.

Here, it is assumed that the surveillance camera 1 and the radio wave monitor node 3 provided at a certain location have been associated with each other in advance, and information indicating that the surveillance camera 1 existing at which location corresponds to which radio wave monitor node 3 has been stored in the information processing apparatus 10 in advance. In addition, it is assumed that the surveillance camera 1 and the radio wave monitor node 3 provided at a certain location have been set in advance so as to be temporally synchronized with each other.

Upon imaging a subject to be imaged that is positioned in the imaging field of view to generate a captured image including a still image or video, the surveillance camera 1 outputs at any time image data of the captured image (imaged image data) and a time stamp that represents a time when the captured image data is generated to the information processing apparatus 10. In addition, upon detecting radio waves existing around the radio wave monitor node 3, the radio wave monitor node 3 observes various feature values (such as identification information specific to radio waves and electric field intensity, for example) that characterize the radio waves, and assuming them as radio wave information, outputs at any time data regarding the radio wave information (radio wave information data) and a time stamp that represents a time when the radio wave information is generated to the information processing apparatus 10.

Note that it is preferable that captured image data generated by the surveillance camera 1 is correlated with identification information (ID information) specific to the surveillance camera having generated the captured image data, and it is preferable that radio wave information data generated by the radio wave monitor node 3 is correlated with identification information (ID information) specific to the radio wave monitor node 3 having generated the radio wave information data. This allows the information processing apparatus 10 having acquired these pieces of data to easily grasp at which location the surveillance camera 1 and the radio wave monitor node 3 having sent the acquired data are provided.

With the recent developments in information communication technology, a person has often held an electronic appliance or a communication appliance having a wireless communication function, such as a mobile phone, a smartphone, a portable game console, a tablet terminal, or a wearable terminal. In addition there are also many objects (for example, various types of transportation means such as a vehicle, on which a person holding an appliance as described above is aboard or on which an appliance as described above has been mounted) including/containing an appliance such as a mobile phone, a smartphone, a portable game console, a tablet terminal, a wearable terminal, or a car navigation system. Thus, it can be said that radio waves observed by the radio wave monitor node 3 are highly likely to also include radio waves from a subject to be imaged that holds or includes an electronic appliance or a communication appliance having a wireless communication function as described above and having been imaged by the surveillance camera 1.

The information processing apparatus 10 according to the present embodiment records captured image data sent from the surveillance camera 1 at each location in correlation with the time stamp sent together, and records radio wave information data sent from the radio wave monitor node 3 at each location in correlation with the time stamp sent together. Here, since the surveillance camera 1 and the radio wave monitor node 3 have been associated with each other in advance and have been set so as to temporally synchronize with each other as described earlier, the information processing apparatus 10 is capable of associating captured image data imaged by the surveillance camera 1 and radio wave information generated by the radio wave monitor node 3 with each other by way of a time stamp.

The relationship between the information processing apparatus 10 according to the present embodiment and another appliance has been described above in detail with reference to FIG. 1 and FIG. 2.

[Regarding Configuration of Information Processing Apparatus]

Next, with reference to FIG. 3 to FIG. 7, an example of a configuration of the information processing apparatus 10 having functions as described above will be described in detail. FIG. 3 is a block diagram showing an example of a configuration of the information processing apparatus according to the present embodiment. FIG. 4 to FIG. 7 are explanatory diagrams each showing an example of a data structure of data stored in a storage unit of the information processing apparatus according to the present embodiment.

Figure 3:
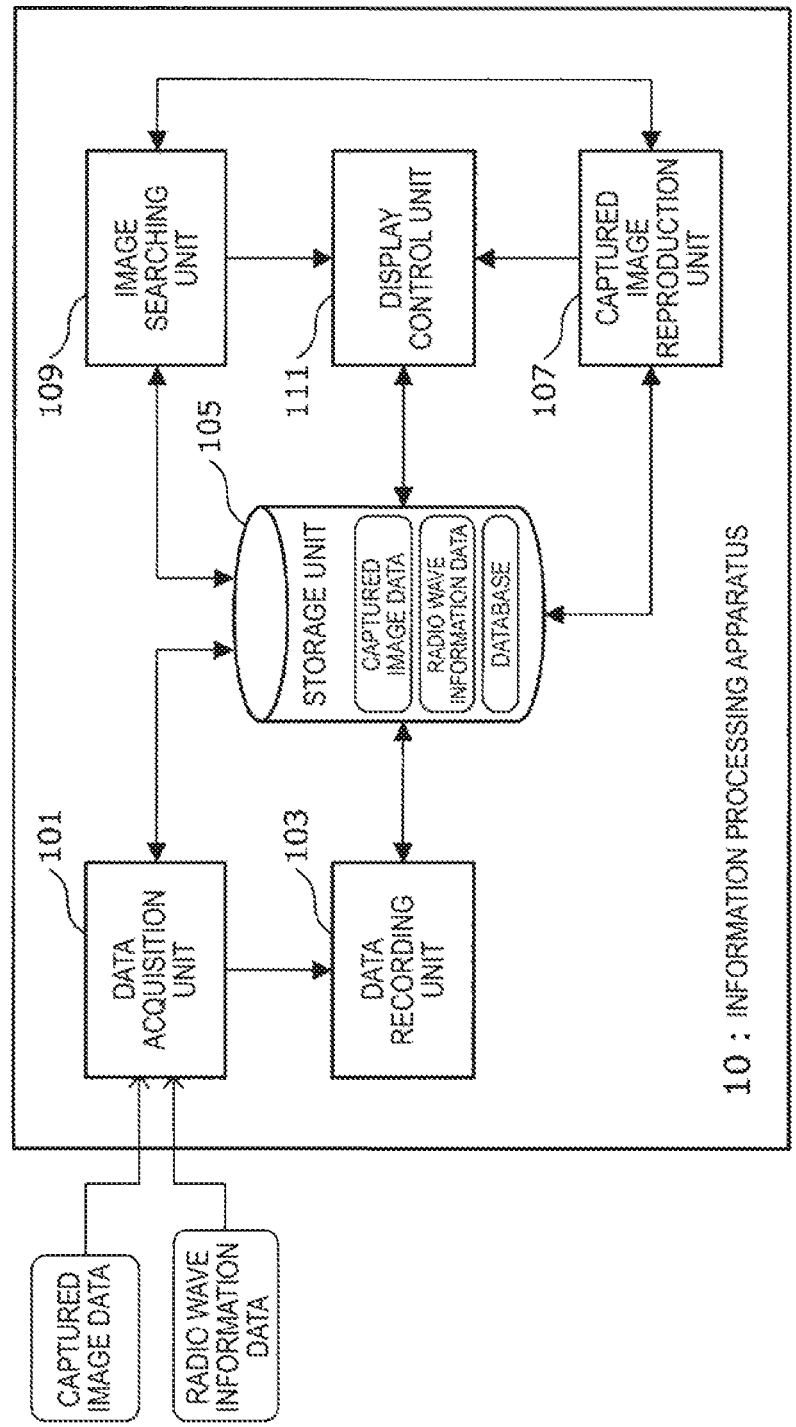
FIG. 3 is a block diagram showing an example of a configuration of the information processing apparatus according to the embodiment.

The information processing apparatus 10 according to the present embodiment mainly includes a data acquisition unit 101, a data recording unit 103, a storage unit 105, a captured image reproduction unit 107, an image searching unit 109, and a display control unit 111, as shown in FIG. 3.

Note that description will be made below referring to a case where the information processing apparatus 10 according to the present embodiment internally has a storage device that stores captured image data and radio wave information data as an example, but it is needless to say that the storage device that stores captured image data and radio wave information data may be provided outside the information processing apparatus 10. In addition, the data acquisition unit 101, the data recording unit 103, the storage unit 105, the captured image reproduction unit 107, the image searching unit 100, and the display control unit 111 which will be described below in detail are provided in a manner distributed to a plurality of information processing apparatuses existing on various networks such as the Internet, and the plurality of information processing apparatuses may cooperate with one another to implement the functions of the information processing apparatus 10 according to the present embodiment.

The data acquisition unit 101 is implemented by a central processing unit (CPU), a read only memory (ROM), a random access memory (RAM), a communication device, or the like, for example. The data acquisition unit 101 acquires captured image data and a time stamp sent from each surveillance camera 1, and acquires radio wave information data and a time stamp sent from each radio wave monitor node 3. That is, the data acquisition unit 101 functions as a communication unit that implements each of communication between the surveillance camera 1 and the information processing apparatus 10 and communication between the radio wave monitor node 3 and the information processing apparatus 10. The captured image data and the time stamp as well as the radio wave information data and the time stamp having been acquired are transmitted to the data recording unit 103 which will be described later.

The data recording unit 103 is implemented by a CPU, a ROM, a RAM, or the like, for example. The data recording unit 103 correlates the captured image data and the time stamp transmitted from the data acquisition unit 101 with each other, and then stores the captured image data and the time stamp at a predetermined place in the storage unit 105 which will be described later. The data recording unit 103 also correlates the radio wave information data and the time stamp transmitted from the data acquisition unit 101 with each other, and then stores the radio wave information data and the time stamp at a predetermined place in the storage unit 105 which will be described later. Accordingly, in the storage unit 105 which will be described later, captured image data output at any time from each surveillance camera 1 and radio wave information data output at any time from each radio wave monitor node 3 are accumulated. Here, in a case where various types of data are sent from a plurality of surveillance cameras 1 and a plurality of radio wave monitor nodes 3 to the information processing apparatus 10, it is preferable that the data recording unit 103 further correlates ID information specific to the surveillance cameras 1 and the radio wave monitor nodes 3 with the above-described data in order to make it possible to easily distinguish which data has been sent from an appliance provided at which location.

The storage unit 105 is implemented by the RAM, the storage device, or the like included in the information processing apparatus 10 according to the present embodiment, for example. Various parameters, progress of processing, and the like needed to be saved when the information processing apparatus 10 according to the present embodiment performs some processing, or various databases, programs, and the like are recorded in the storage unit 105 as necessary.

For example, in this storage unit 105, a database indicating a correspondence between one or more surveillance cameras 1 from which the information processing apparatus 10 acquires captured image data and the radio wave monitor node(s) 3 associated with the surveillance camera(s) 1 has been recorded. An example of a data structure of the database (hereinafter simply referred to as an "association database (DB)" as well) indicating the correspondence is schematically shown in FIG. 4. As schematically shown in FIG. 4, to the association DB, ID information specific to the surveillance cameras 1 and ID information specific to the radio wave monitor nodes 3 associated with these surveillance cameras 1 have been recorded in relation to each other. By referring to this association DB, the respective processing units (in particular, the image searching unit 109 which will be described later) of the information processing apparatus 10 can easily grasp which of the surveillance cameras 1 and which of the radio wave monitor nodes 3 have been associated.

Note that the type of ID information recorded in the association DB as described above and the ID information describing method are not particularly limited, but any type and any describing method that are publicly known can be utilized as necessary.

In addition, in the storage unit 105, captured image data generated by each of the surveillance cameras 1 and radio wave information data generated by each of the radio wave monitor nodes 3 have each been recorded, by the data recording unit 103 in correlation with a time stamp. An example of a data structure of a database (hereinafter simply referred to as an "captured image database (DB)" as well) concerning captured image data is schematically shown in FIG. 5, and an example of a data structure of a database (hereinafter simply referred to as a "radio wave information database (DB)" as well) concerning radio wave information data is shown in FIG. 6.

As schematically shown in FIG. 5, in the captured image DB, captured image data imaged by a certain surveillance camera 1 (or information indicating a storage location of the captured image data) has been recorded in correlation with a time stamp indicating the date and time when the captured image data is generated. In addition, it is preferable that, in the captured image DB, ID information regarding a surveillance camera having generated the captured image data has been further correlated. In addition, as schematically shown in FIG. 6, in the radio wave information DB, radio wave information data generated by a certain radio wave monitor node 3 (or information indicating a storage location of the radio wave information data) has been recorded in correlation with a time stamp indicating the date and time when the radio wave information data is generated. In addition, it is preferable that, in the radio wave information DB, ID information regarding a radio wave monitor node having generated the radio wave information data has been further correlated.

Note that information recorded in the captured image DB shown in FIG. 5 and information recorded in the radio wave information DB shown in FIG. 6 are not limited to those shown in FIG. 5 and FIG. 6, but any information concerning captured image data and radio wave information data can be added to these DBs. In addition, the method of describing time stamps shown in FIG. 5 and FIG. 6 is not particularly limited, but time stamps may be expressed utilizing any describing method as necessary.

Note that radio wave information data stored in the storage unit 105 may have any data structure as long as feature values that characterize observed radio waves, such as ID information specific to observed radio waves and the electric field intensity, have been described. An example of a data structure of the radio wave information data is schematically shown in FIG. 7. Identification information such as a MAC address which is information specific to each observed radio wave, the electric field intensity of radio waves, and the like have been described in radio wave information generated by the radio wave monitor node 3 and stored in the storage unit 105, as schematically shown in FIG. 7. In addition, any feature value that characterizes observed radio waves may be described besides these feature values. In addition, in a case where a plurality of radio waves are observed at a time in a certain radio wave monitor node 3, information as described above is recorded in the radio wave information with respect to each of the observed radio waves.

In the storage unit 105 in which such various types of information have been stored, the data acquisition unit 101, the data recording unit 103, the captured image reproduction unit 107, the image searching unit 109, the display control unit 111, and the like are capable of freely performing data reading/writing processing.

The captured image reproduction unit 107 is implemented by a CPU, a ROM, a RAM, or the like, for example. The captured image reproduction unit 107 carries out processing of reproducing a captured image designated by a user among a plurality of captured images recorded in the storage unit 105, in accordance with a user operation carried out on the information processing apparatus 10. A selection of a captured image to be reproduced made by a user is carried out by the captured image reproduction unit 107 performing an appropriate display on a display screen of the information processing apparatus 10 in mutual cooperation with the display control unit 111 which will be described later. In addition, a captured image reproduced by the captured image reproduction unit 107 is displayed at any time in an appropriate area on the display screen under the control of the display control unit 111 which will be described later. This allows the user to view a desired captured image on the display screen of the information processing apparatus 10.

The image searching unit 109 is implemented by, a CPU, a ROM, a RAM, or the like, for example. The image searching unit 109 reads various types of data, such as radio wave information recorded in the storage unit 105, and using a captured image designated by a uses operation as a captured image serving as a search basis, as to a subject to be imaged that appears in the designated captured image serving as a search basis, searches a plurality of captured images recorded in the storage unit 105 for another captured image in which the subject to be imaged appears. On this occasion, the image searching unit 109 does not search for a subject to be imaged that appears in the captured in image serving as a search basis by so-called image analysis processing, but searches for a desired captured image utilizing radio wave information generated together with the captured image serving as a search basis.

That is, as described earlier with reference to FIG. 2, nowadays, a subject of interest to be imaged is highly likely to hold or include an electronic appliance or a communication appliance emitting various radio waves such as radio waves for use in wireless communication, for example. Therefore, the image searching unit 109 according to the present embodiment pays attention to radio wave information generated together with a captured image serving us a search basis, and utilizes information included in the radio wave information to generate a search condition. Then, the image searching unit 109 according to the present embodiment extracts radio wave information that matches a search condition concerning radio waves and specifies a captured image corresponding to the extracted radio wave information.

When image searching processing as described above is carried out, in the information processing apparatus 10 according to the present embodiment, it is possible to easily search a plurality of captured images for a captured image in which a subject to be imaged that has once appeared in a captured image appears again.

Note that the image searching processing carried out in the image searching unit 109 will be described below again in detail.

The display control unit 111 is implemented by a CPU, a ROM, a RAM, an output device, a communication device, or the like, for example. The display control unit 111 performs display control when displaying a captured image being reproduced by the captured image reproduction unit 107 or a captured image found by the image searching unit 109 on an output device such as a display included in the information processing apparatus 10, an output device provided outside the information processing apparatus 10, or the like. In addition, the display control unit 111 also carries out display control when displaying a display screen for use when a uses designates a captured image to be viewed or a display screen for use when searching for a captured image on a predetermined output device or the like. This allows the user of the information processing apparatus 10 to view a desired captured image on the spot.

Note that processing of display control of a display screen carried out by the display control unit 111 will also be described later in detail while citing specific examples.

The above illustrates an example of the functions of the information processing apparatus 10 according to the present embodiment. Each of the above structural elements may be realized using general-purpose members or circuits, but may also be realized using hardware specialized in the function of each structural element. In addition, the functions of each of the structural elements may also be conducted entirely by a CPU or the like. Consequently, it is possible to appropriately modify the configuration to be used according to the technical level at the time of carrying out the present embodiment.

Note that it is also possible to create a computer program for realizing the respective functions of the information processing apparatus according to the present embodiment as discussed above, and implement the computer program in a personal computer or the like. In addition, a computer-readable recording medium having such a computer program stored therein can also be provided. The recording medium is a magnetic disk, an optical disc, a magneto-optical disc, a flash memory, or the like, for example. Furthermore, the above computer program may also be delivered via a network, for example, without using a recording medium.

[Regarding Details of Captured Image Searching Processing and Examples of Display Screen]

Figure 8:
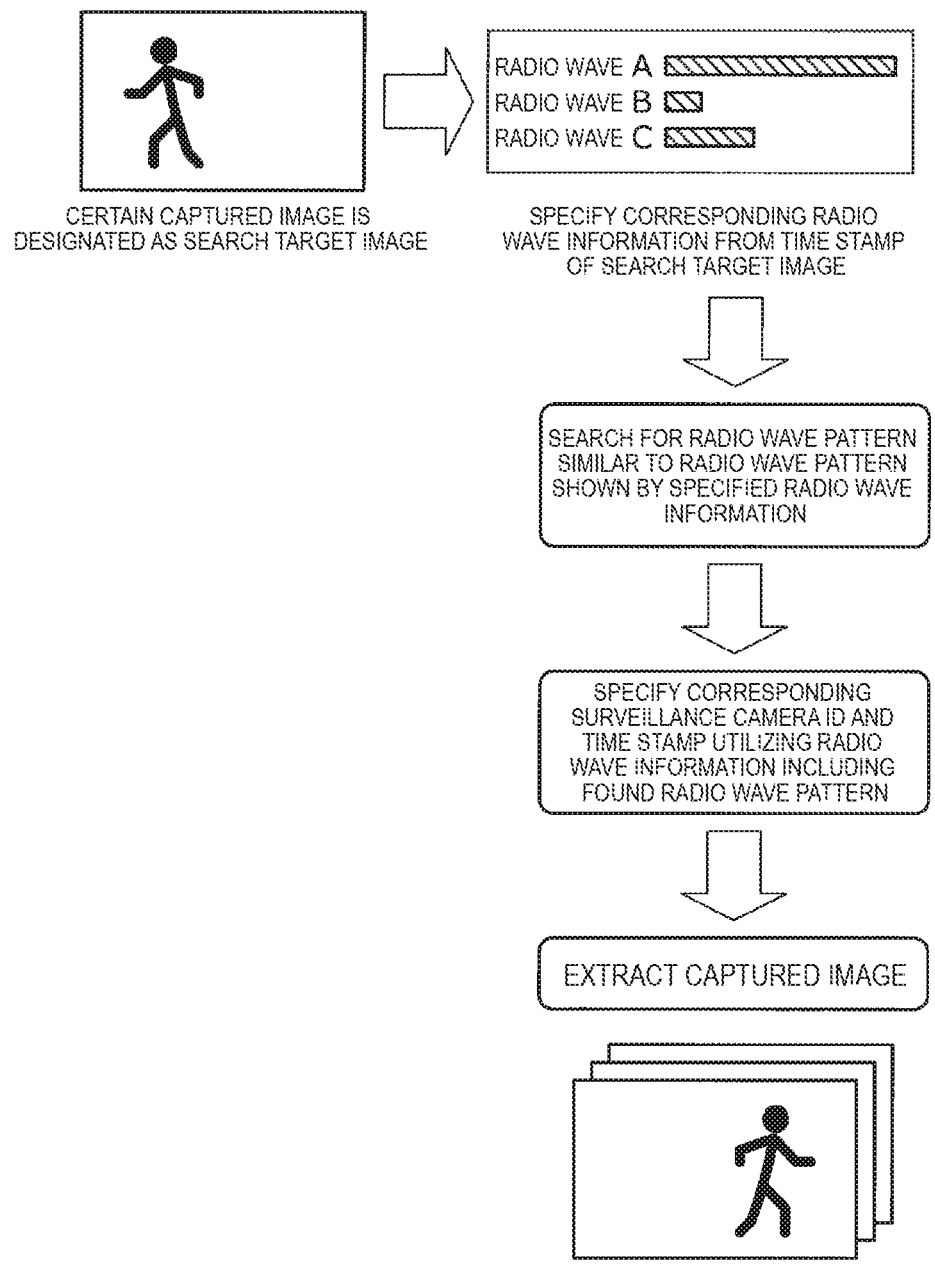
FIG. 8 is an explanatory diagram for describing image searching processing carried out in the information processing apparatus according to the embodiment.

Next, captured image searching processing and processing of controlling a display of a display screen carried out in the information processing apparatus 10 according to the present embodiment will be described specifically with reference to FIG. 8 to FIG. 15. FIG. 8 is an explanatory diagram for describing image searching processing carried out in the information processing apparatus according to the present embodiment. FIG. 9 to FIG. 15 are explanatory diagrams each schematically showing an example, of a display screen of the information processing apparatus according to the present embodiment.

General Flow of Captured Image Searching Processing

First, a general flow of captured image searching processing carried out in the image searching unit of the information processing apparatus 10 according to the present embodiment will be described with reference to FIG. 8.

In a case where a certain captured image is designated as a search target image by a user operation, the image searching unit 109 according to the present embodiment searches for a desired captured image utilizing not so-called image analysis processing, but radio wave information.

In more detail, the image searching unit 109 specifies a time stamp associated with a captured image having, become a scotch target image according to the user operation, referring to the captured image DB recorded in the storage unit 105 or the like. As described earlier, the surveillance camera 1 by which a captured image is generated and the radio wave monitor node 3 by which radio wave information is generated have been set so as to be temporally synchronized with each other. Thus, as shown at the top of FIG. 8, the image searching unit 109 can search the radio wave information DB recorded in the storage unit 105 or the like utilizing the specified time stamp of a captured image to specify radio wave information having a time stamp of the same time.

Thereafter, utilizing a radio wave pattern obtained by schematically showing the degree of electric field intensity of each radio wave included in the radio wave information) shown by the specified radio wave information, the image searching unit 109 searches for a radio wave pattern showing a behavior similar to a radio wave pattern corresponding to the search target image. Searching for the radio wave pattern can be carried out by performing pattern matching between a radio wave pattern shown by recorded radio wave information and a radio wave pattern corresponding to the search target image, referring to the radio wave information DB recorded in the storage unit 105 or the like. Here, the degree of similarity utilized in the pattern matching is not particularly limited, but it is possible to utilize a publicly-known degree of similarity, such as a cross-correlation coefficient, for example.

In a case where a radio wave pattern similar to a radio wave pattern corresponding to the search target image to a degree of similarity of a predetermined threshold value or higher has been detected, the image searching unit 109 specifies the ID of a corresponding surveillance camera 1 and a time stamp utilizing radio wave information including the found radio wave pattern. That is, the image searching unit 109 specifies the ID of the radio wave monitor node 3 having generated radio wave information of interest and a time stamp referring to the radio wave information DB recorded in the storage unit 105 or the like. Thereafter, the image searching unit 109 specifies the ID of the surveillance camera 1 associated with the specified radio wave monitor node 3 referring to the association DB recorded in the storage unit 105 or the like.

Subsequently, the image searching unit can extract a captured image corresponding to the found radio wave information by searching the captured image DB recorded in the storage unit 105 or the like on the basis of the ID of the surveillance camera 1 and the time stamp having been obtained.

Here, since an electronic appliance or a communication appliance being held by or included in a subject to be imaged does not necessarily emit radio wave signals at regular intervals, it may also be considered that a time difference occurs between generated radio wave information and a captured image. Thus, in addition to a captured image corresponding to the specified time stamp, it is preferable that the image searching unit 109 selects captured images taken during a predetermined period before and after (for example, about several seconds to several tens of seconds before and after) this specified captured image. Accordingly, even in a case where a time difference resulting from a failure in emitting radio wave signals at regular intervals has occurred between generated radio wave information and a captured image, it is possible to extract another captured image in which a desired subject to be imaged appears.

Moreover, a case where a plurality of captured images are detected as a result of searching for another captured image in which a desired subject to be imaged appears may also be considered. On this occasion, the image searching unit 109 may present captured images as search results to a user in the order of time stamps associated with the captured images, or the display order of search results may be controlled in accordance with the degree of similarity to a radio wave pattern utilized for searching. In a case of controlling the display order of search results in accordance with the degree of similarity, it is preferable to display search results in descending order of the degree of similarity, for example. Accordingly, it is possible to further improve user convenience.

In addition, the image searching unit 109 may apply publicly-known image analysis processing, such as still image analysis processing or video analysis processing, for example, to search results based on radio wave information as described above. On this occasion, in a case where the movement of a subject to be imaged is not included in captured images as search results, a case where no person appears as a subject to be imaged, or the like, the image searching unit 109 may perform search result presentation processing, such as calling attention to a user or displaying by priority a search result to be given higher priority, by highlighting the captured image, decreasing the priority of display order, or the like.

The image searching unit 109 causes a captured image specified in the foregoing manner to be displayed on the display screen of the information processing apparatus 10 in mutual cooperation with the display control unit 111. This allows a user of the information processing apparatus 10 to select a captured image corresponding to an obtained search result via a user interface displayed on the display screen and check the contents.

Specific Examples of User Interface

Next, a user interface in the captured image searching processing carried out in the information processing apparatus 10 according to the present embodiment will be described specifically with reference to FIG. 9 to FIG. 15.

Figure 9:
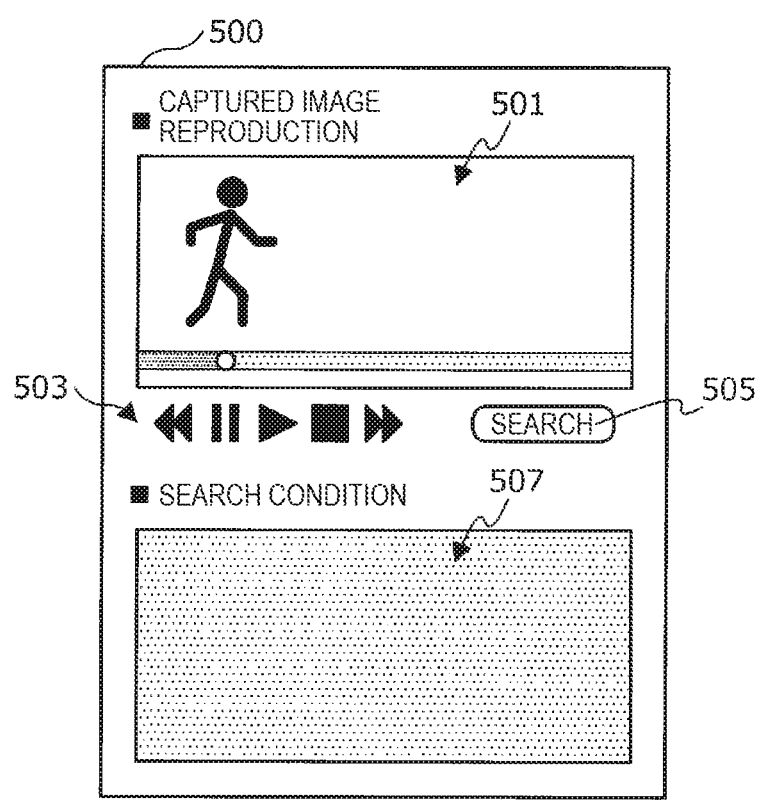
FIG. 9 is an explanatory diagram schematically showing an example of a display screen of the information processing apparatus according to the embodiment.

In the information processing apparatus 10 according to the present embodiment, the captured image reproduction unit 107 and the display control unit 111 cooperate with each other to cause a display screen 500 as schematically shown in FIG. 9 to be displayed on an output device, such as a display, while processing of reproducing a captured image is being carried out.

On this display screen 500, a captured image display area 501 in which a captured image designated by a user operation is displayed and a reproduced state designating object 503 for designating a reproduced state of a captured image designated by a user operation are provided by the display control unit 111, as schematically shown in FIG. 9. The user can reproduce a desired captured image in the captured image display area 501 by operating a pointing object not shown to operate the reproduced state designating object 503.

In addition, on the display screen 500, a search processing starting object 505 for causing a captured image searching mode to operate and a search condition setting area 507 are provided by the display control unit 111. When the search processing starting object 505 is operated by a user operation, in the search condition setting area 507, radio wave information corresponding to a captured image displayed in the captured image display area 501 when the search processing starting object 505 is operated is displayed in the search condition setting area 507. Moreover, in this search condition setting area 507, an object for designating at least one of the intensity and number of radio waves is displayed in addition to the radio wave information corresponding to the captured image displayed in the captured image display area 501. In accordance with a user operation on this search condition setting area 507, a search condition for the captured image searching processing is set.

When a search condition is set by a user operation on the search condition setting area 507 and search processing as described above is carried out by the image searching unit 109, information concerning search results is output from the image searching unit 109 to the display control unit 111. The display control unit 111 causes the display screen 500 as shown in FIG. 10 to be displayed on the basis of the acquired information concerning search results.

In this case, a search result display area 509 is provided on the display screen 500, and information concerning one or more captured images (such as thumbnail images of found captured images, for example) having been found is displayed in this search result display area 509. When one of the search results displayed in the search result display area 509 is selected by a user operation, a captured image selected by a pointing object 513 is displayed in a search result detail display area 511 provided on the display screen 500. On this occasion, as mentioned earlier, it is preferable to display search results in descending order of the degree of similarity, in accordance with the degree of similarity to the radio wave pattern utilized for searching.

Figure 10:
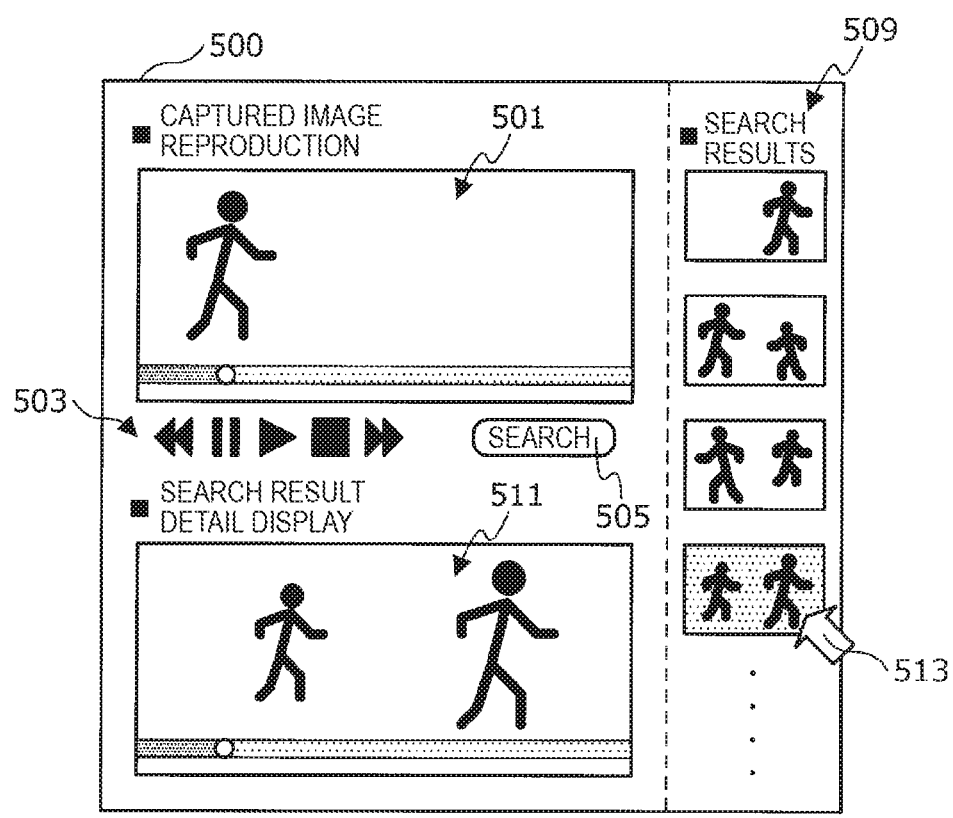
FIG. 10 is an explanatory diagram schematically showing an example of a display screen of the information processing apparatus according to the embodiment.

Note that FIG. 10 illustrates a case where search results obtained by the image searching unit 109 are displayed, by a list display in which thumbnail images are utilized, whilst the method of displaying search results is not limited to the example shown in FIG. 10. For example, as schematically shown in FIG. 11, captured images as search results may be displayed in the time line utilizing time stamps associated with the captured images as search results.

On this occasion, the display control unit 111 may cause radio wave detection point indicating objects 515 that represent temporal positions at which radio waves have been detected to be displayed together with thumbnail images displayed as search results. By causing, these radio wave detection point indicating objects 515 to be displayed, a user can easily grasp at which time on the time line radio wave information corresponding to captured images as search results has been observed.

Figure 11:
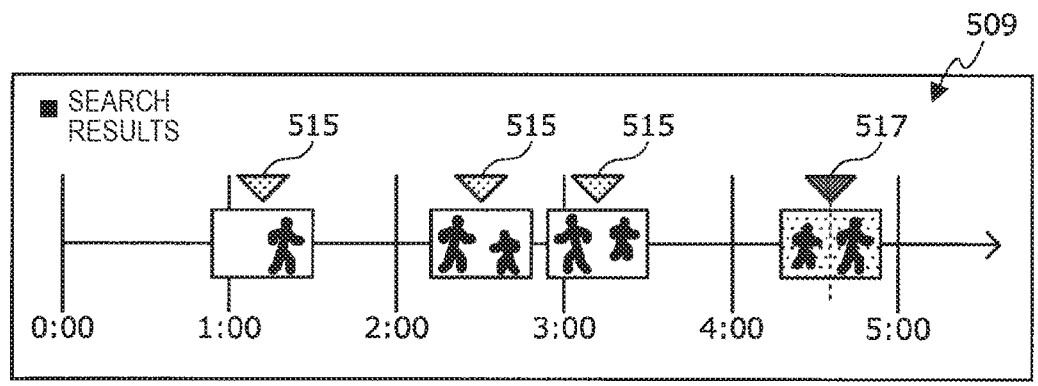
FIG. 11 is an explanatory diagram schematically showing an example of a display screen of the information processing apparatus according to the embodiment.

Moreover, on the time line display as shown in FIG. 11, the display control unit 111 may cause a reproduced position instructing object 517 that represents a reproduced position to be displayed together with a captured image selected by a user operation and being reproduced in the search result detail display area 511. This allows the user to easily grasp to which position on the time axis the captured image being currently viewed corresponds.

Next, contents displayed in the search condition setting area 507 will be described specifically with reference to FIG. 12 to FIG. 15.

Figure 12:
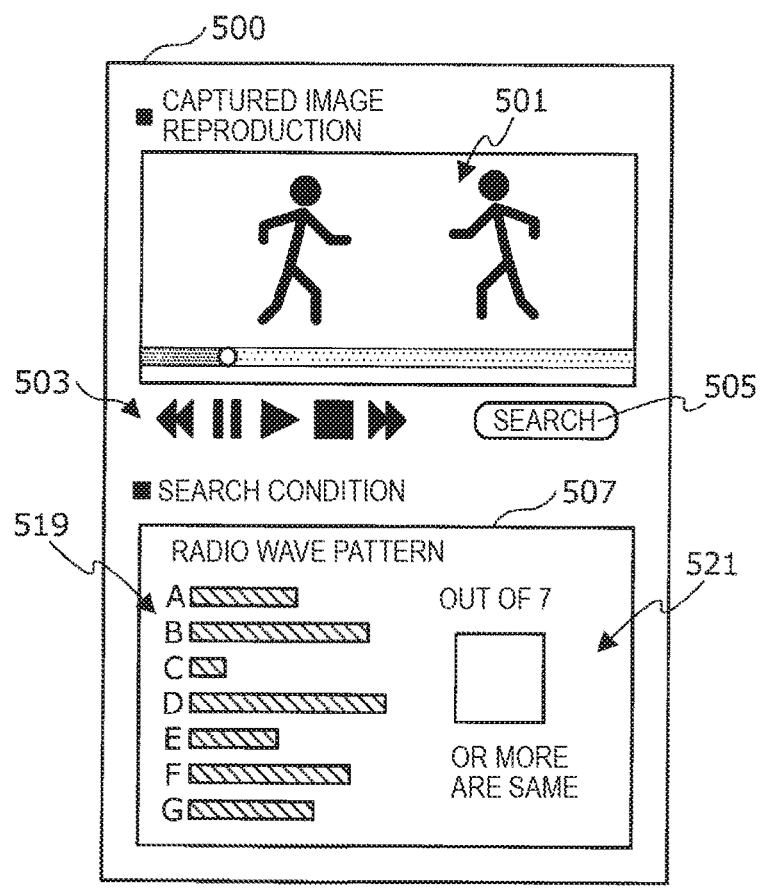
FIG. 12 is an explanatory diagram schematically showing an example of a display screen of the information processing apparatus according to the embodiment.

As schematically shown in FIG. 12, in a case where a captured image in which a plurality of persons appear, for example, has been designated as a search target image, or the like, individual radio waves are highly likely to be emitted from the respective persons. Thus, a plurality of strong radio waves are highly likely to base been observed m radio wave information corresponding to the search target image. Therefore, the image searching unit 109 causes a radio wave pattern display object 519 which is an object showing a radio wave intensity pattern (electric field intensity pattern) to be displayed in the search condition setting area 507 in mutual cooperation with the display control unit 111, as shown in FIG. 12. The example shown in FIG. 12 shows a case where information concerning seven radio waves, i.e., a radio wave A to a radio wave G, is included in radio wave information corresponding to a search target image, and the radio wave B, the radio wave D, and the radio wave F have relatively strong electric field intensities.

In this manner, in a case where information concerning a plurality of strong radio waves is included in radio wave information, the image searching unit 109 may cause a number designating object 521 for designating the number of the radio waves utilized for searching, for example, to be displayed in the search condition setting area 507. When the number of radio waves utilized for searching is input in the number designating object 521 by a user operation, the image searching unit 109 searches a plurality of pieces of radio wave information for the radio wave information using whether a designated number of radio wave patterns or more match among radio wave patterns corresponding to a search target image as a search condition. Further, in a case where the number has not been input in the number designating object 521 by a user operation, the image searching unit 109 searches a plurality of pieces of radio wave information for the radio wave information on the basis of a radio wave patterns in which an electric field intensity of a predetermined threshold value or higher has been observed.

Note that radio wave information that has a relatively small electric field intensity though the shape of the radio wave patterns (in the case of FIG. 12, the shape given by bars showing electric field intensities of seven radio waves) is similar may also be included in radio wave information extracted as search results. Therefore, it is preferable that the image searching unit 109 extracts pieces of radio wave information that are similar in the shape of radio wave patterns and in which the electric field intensity of each radio wave is a predetermined threshold value or higher as search results.

The image searching unit 109 may cause the obtained search results to be displayed by a time line display as shown in FIG. 11, or to be displayed by a list display as shown in FIG. 10. In a case of causing the search results to be displayed by a list display, it is preferable that the image searching unit 109 causes thumbnail images corresponding to the search results to be displayed in descending order of the number of matched radio wave patterns, for example.

Figure 13:
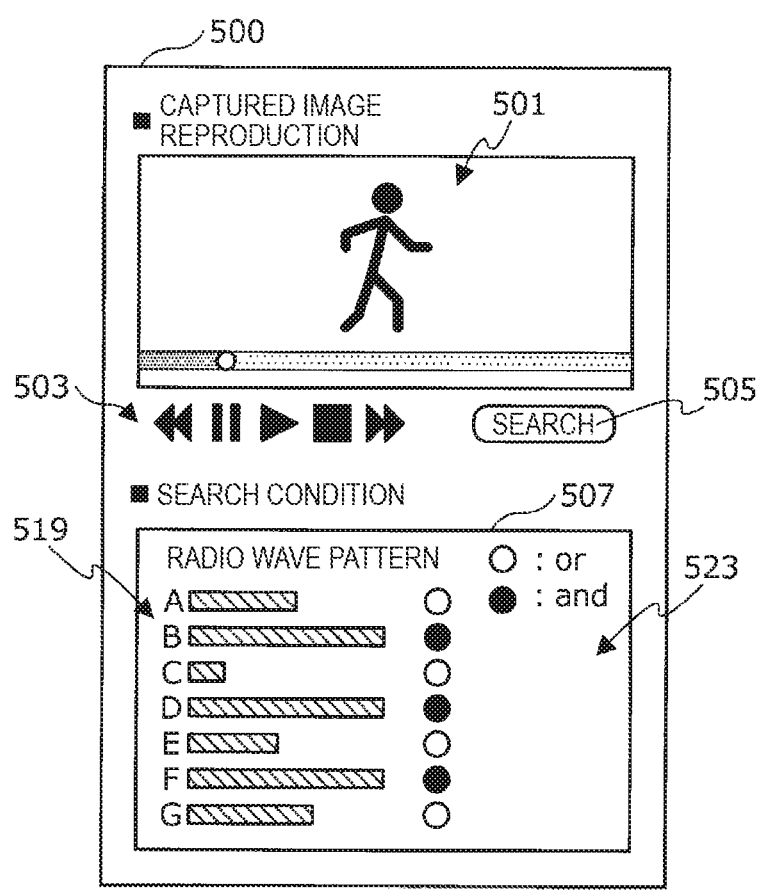
FIG. 13 is an explanatory diagram schematically showing an example of a display screen of the information processing apparatus according the embodiment.

In recent years, a single person has often possessed a plurality of electronic appliances or communication appliances having a wireless communication function. In a case where a captured image in which such a person appears has been designated as a search target image, it may also be considered that a plurality of radio waves having strong electric field intensities are observed even in a case where a single person appears, as schematically shown in FIG. 13. On this occasion, the image searching unit 109 may cause the radio wave pattern display object 519 and the number designating object 521 as shown in FIG. 12 to be displayed in the search condition setting area 507, but may cause an object as will be described below to be displayed.

That is, as shown in FIG. 13, the image searching unit 109 may cause a combination designating object 523 to be displayed together with the radio wave pattern display object 519 in cooperation with the display control unit 111 to cause a condition for combining radio waves utilized for searching to be designated. FIG. 13 shows button-like objects for designating and/or as the combination designating object 523, whilst it is needless to say that the combination designating object 523 is not limited to those shown in FIG. 13, but another object that exerts similar effects can be utilized. Here, the image searching unit 109 and the display control unit 111 may cause a combination of radio waves having the strongest electric field intensity to be displayed as a default display format.

Similarly to the case shown in FIG. 12, the image searching unit 109 searches a plurality of pieces of radio wave information for pieces of radio wave information that match to a degree of similarity of a predetermined threshold value or higher on the basis of radio wave patterns of radio waves designated to be combined. On this occasion, it is preferable that the image searching unit 109 extracts pieces of radio wave information that are similar in the shape of combined radio wave patterns and in which the electric field intensity of each radio wave is a predetermined threshold value or higher as search results.

Similarly in the case shown in FIG. 13 as well, the image searching unit 109 may also cause obtained search results to be displayed by a time line display as shown in FIG. 11, or to be displayed by a list display as shown in FIG. 10.

Figure 14:
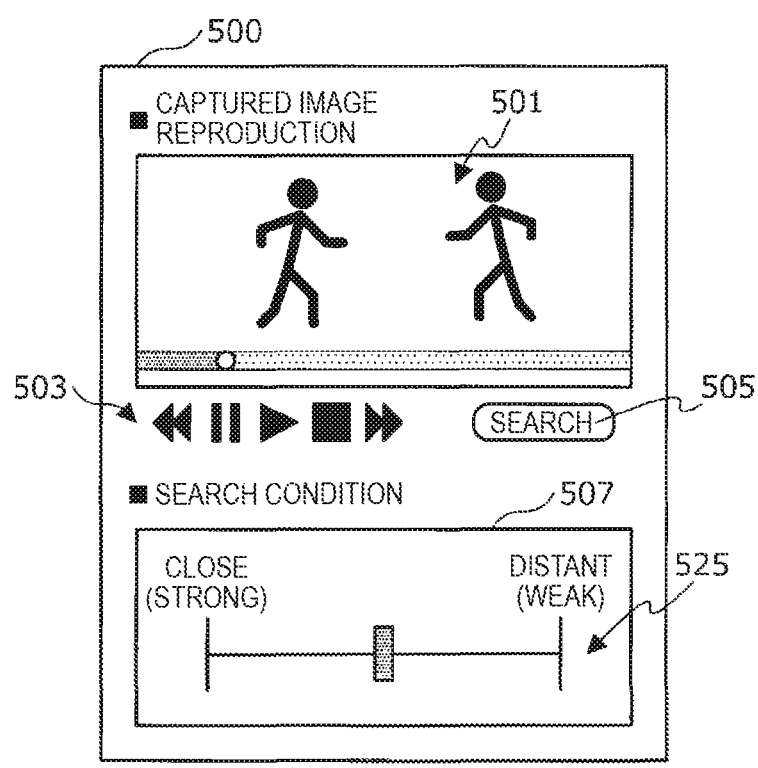
FIG. 14 is an explanatory diagram schematically showing an example of a display screen of the information processing apparatus according to the embodiment.

Moreover, as shown in FIG. 14, for example, in a case where a plurality of radio waves are observed because a plurality of persons appear, or the like, it is also possible to use a relative intensity of radio waves as a search condition. That is, as the separation distance between the radio wave monitor node 3 and an electronic appliance or a communication appliance held by a person decreases, the electric field intensity detected by the radio wave monitor node 3 increases, and as the separation distance increases, the electric field intensity detected by the radio wave monitor node 3 decreases. In this case, it is considered that, as the separation distance decreases, a displayed size of a subject to be imaged in a captured image increases, and as the separation distance increases, a displayed size of the subject to be imaged in a captured image decreases. Thus, by designating a relative threshold value concerning the electric field intensity (which is, in other words, a threshold value of a relative separation distance from the radio wave monitor node 3 as well, and a threshold value of a relative displayed size of the subject to be imaged in a captured image as well), it is possible to select a desired radio wave from among a plurality of observed radio waves.

Therefore, the image searching unit 109 may cause a threshold value designating object 525 for designating a relative threshold value as described above to be displayed in the search condition setting area 507, in mutual cooperation with the display control unit 111. A specific example of the threshold value designating object 525 is not particularly limited, but may be a slider-like object as shown in FIG. 14, or may be another object that exerts similar effects.

In a case where the threshold value designating object 525 is positioned at the center of a selectable range of this threshold value designating object 525, the image searching unit 109 may search for radio wave information having an electric field intensity of the same degree as that of a radio wave pattern corresponding to a search target image. In addition, in a case where the threshold value designating object 525 is positioned to the left with respect to the center of the selectable range (that is, a portion on the "CLOSE" side), the image searching unit 109 may search for radio wave information focusing on an electric field intensity stronger than that of a radio wave pattern corresponding to a search target image. Similarly, in a case where the threshold value designating object 525 is positioned to the right with respect to the center of the selectable range (that is, a portion on the "DISTANT" side), the image searching unit 109 may search for radio wave information also paying attention to an electric field intensity weaker than that of a radio wave pattern corresponding to the search target image.

By utilizing such a threshold value designating object 525, a captured image obtained only in a case where a search target object appearing in a search target image, for example, exists close to the radio wave monitor node 3 or the surveillance camera 1 can be easily extracted from a plurality of captured images.

Similarly in the case shown in FIG. 14 as well, the image searching unit 109 may cause the obtained search results to be displayed by a time line display as shown in FIG. 11, or to be displayed by a list display as shown in FIG. 10.

Figure 15:
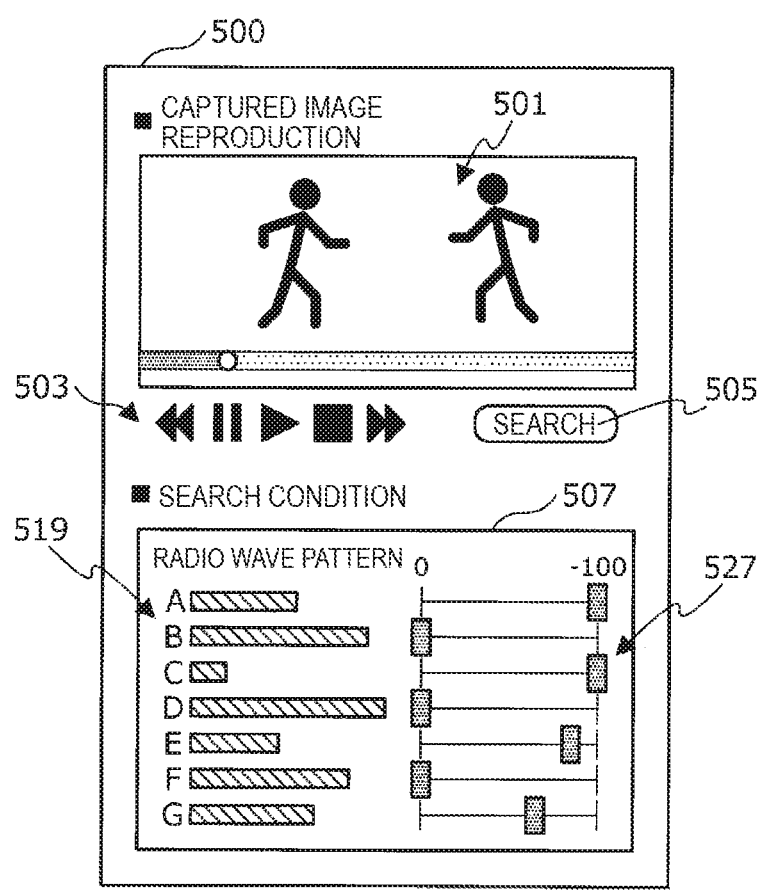
FIG. 15 is an explanatory diagram schematically showing an example of a display screen of the information processing apparatus according to the embodiment.

In addition, the image searching unit 109 may cause the radio wave pattern display object 519 and a combination/threshold value designating object 527 to be displayed in the search condition setting area 507 in mutual cooperation with the display control unit 111, as shown in FIG. 15, for example. The combination/threshold value designating object 527 is an object having both the function of the combination designating object 523 shown in FIG. 13 and the function of the threshold value designating object 525 shown in FIG. 14. For example, in a case where the highest intensity (a position corresponding to "0" in FIG. 15) has been selected in the combination threshold value designating object 527, the image searching unit 109 may carry out a search depending on the presence/absence of corresponding radio waves, irrespective of the designated radio wave intensity. Further, in a case where the lowest intensity (a position corresponding to "−100" in FIG. 15) has been selected in the combination threshold value designating object 527, the image searching unit 109 may carry out a search without utilizing designated radio waves for searching. Further, in a case where a position between the highest intensity and the lowest intensity has been selected in the combination/threshold value designating object 527, an intensity threshold value of each radio wave may be taken into consideration, similarly to the threshold value designating object 525.

By utilizing such a combination/threshold value, designating object 527, a captured image obtained only in a case where an object to be searched for appearing in a search target image, for example, exists close to the radio wave monitor node 3 or the surveillance camera 1 can be easily extracted from a plurality of captured images.

Similarly in the case shown in FIG. 15 as well, the image searching unit 109 may cause the obtained search results to be displayed by a time line display as shown in FIG. 11, or to be displayed by a list display as shown in FIG. 10.

The user interfaces in the captured image searching processing carried out in the information processing apparatus 10 according to the present embodiment have been specifically described above with reference to FIG. 9 to FIG. 15.

<Regarding Information Processing Method>

Figure 16:
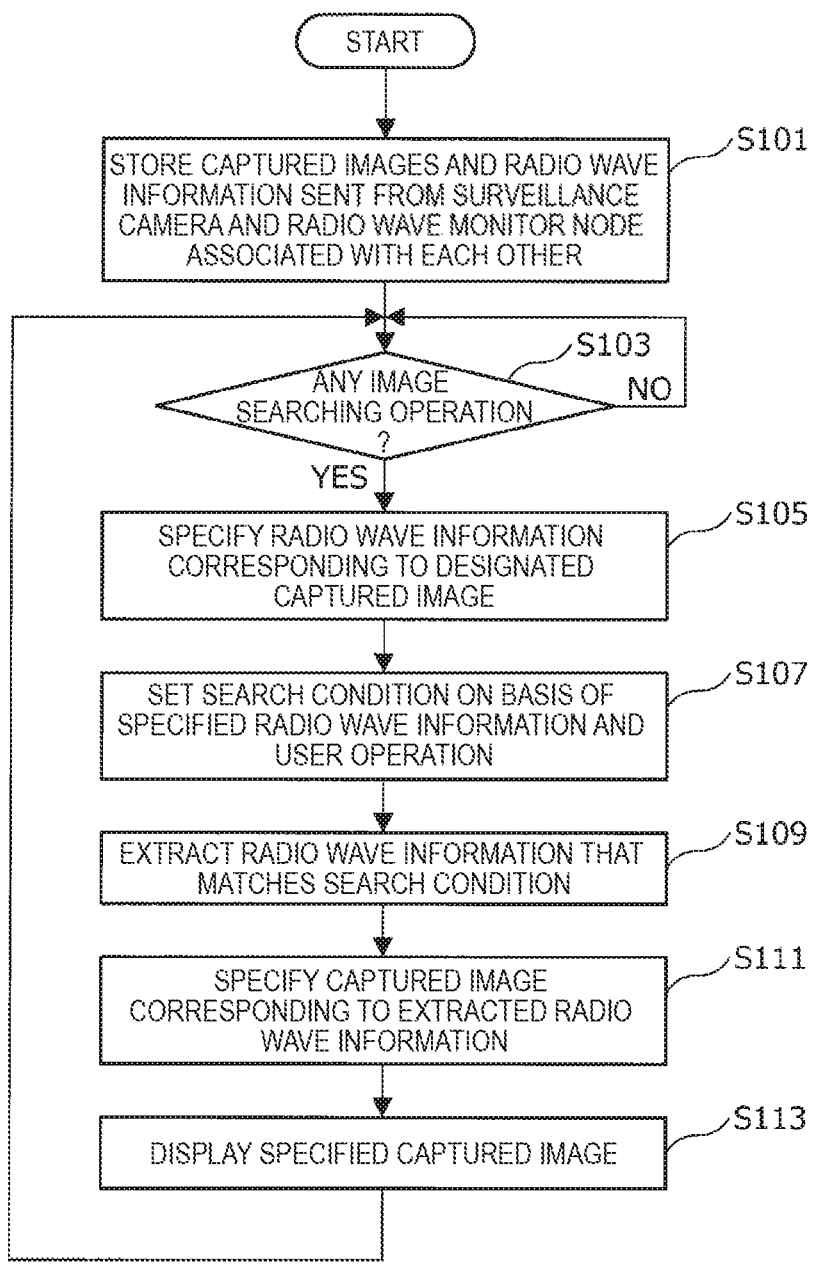
FIG. 16 is a flowchart showing an example of a flow of an information processing method according to the embodiment.

Next, an example of a flow of an information processing method carried out in the information processing apparatus 10 according to the present embodiment will be described briefly with reference to FIG. 16. FIG. 16 is a flowchart showing an example of a flow of an information processing method according to the present embodiment.

Captured images and radio wave information are sent respectively at any time from the surveillance camera 1 and the radio wave monitor node 3 associated with each other to the information processing apparatus 10 according to the present embodiment. Upon acquiring the sent captured images and radio wave information, the data acquisition unit 101 of the information processing apparatus 10 outputs these pieces of acquired data to the data recording unit 103. The data recording unit 103 stores data regarding the acquired captured images in the storage unit 105 in association with a time stamp, and stores data regarding the acquired radio wave information in the storage unit 105 in association with a time stamp (step S101).

Thereafter, the information processing apparatus 10 determines whether an image searching operation has been performed by a user or not (step S103). In a case where an image searching operation has not been performed, the information processing apparatus 10 returns to step S103 to wait for an image searching operation.

On the other hand, in a case where an image searching operation by a user has been performed, the image searching unit 109 of the information processing apparatus 10 specifies radio wave information corresponding to a designated captured image utilizing a time stamp (step S105), and sets a search condition on the basis of the specified radio wave information and a user operation (step S107). Thereafter the image searching unit 100 extracts radio wave information that matches the set search condition from a plurality of pieces of stored radio wave information (step S109). When radio wave information that matches the search condition is extracted, the image searching unit 109 specifies a captured image corresponding to the extracted radio wave information utilizing a time stamp (step S111).

Thereafter, the display control unit 111 of the information processing apparatus 10 causes the specified captured image to be displayed on the display screen (step S113).

This allows a user to easily extract a captured, image that matches the search condition set on the basis of a designated captured image from a plurality of captured images.

An example of a flow of the information processing method carried out in the information processing apparatus 10 according to the present embodiment has been briefly described above with reference to FIG. 16.

Regarding Hardware Configuration

Figure 17:
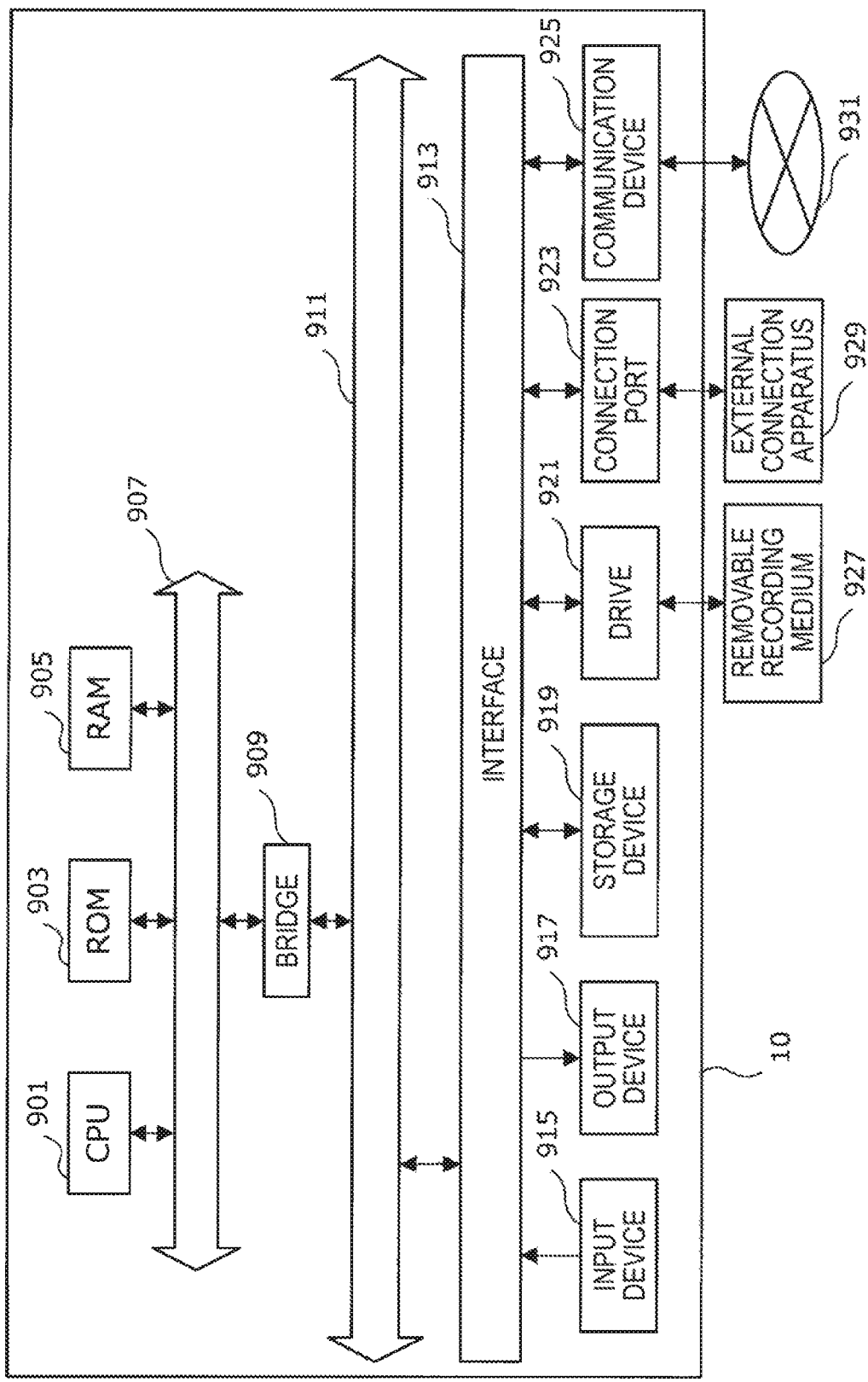
FIG. 17 is a block diagram showing an example of a hardware configuration of an information processing apparatus according to an embodiment of the present disclosure.

Next, the hardware configuration of the information processing apparatus 10 according to the embodiment of the present disclosure will be described in detail with reference to FIG. 17. FIG. 17 is a block diagram for describing the hardware configuration of the information processing apparatus 10 according to the embodiment of the present disclosure.

The information processing apparatus 10 mainly includes a CPU 901, a ROM 903, and a RAM 905. Furthermore, the information processing apparatus 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control apparatus, and controls the overall operation or a part of the operation of the information processing apparatus 10 according to various programs recorded in the ROM 903, the RAM 905, the storage device 919, or a removable recording medium 927. The ROM 903 stores programs, operation parameters and the like used by the CPU 901. The RAM 905 primarily stores programs used the CPU 901 and parameters and the like varying as appropriate during the execution of the programs. These are connected with each other via the host bus 907 including an internal bus such as a CPU bus.

The host bus 907 is connected to the external bus 911 such as a PCI (Peripheral Component Interconnect/Interface) bus via the bridge 909.

The input device is an operation means operated by a user, such as a mouse, a keyboard, a touch panel, buttons, a switch and a lever, for example. Also, the input device may be a remote control means (a so-called remote controller) using, for example, infrared light or other radio waves, or may be an external connection apparatus 929 such as a mobile phone or a PDA conforming to the operation of the information processing apparatus 10. Furthermore, the input device 915 generates an input signal on the basis of, for example, information which is input by a user with the above operation means, and includes an input control circuit or the like for outputting the input signal to the CPU 901. The user of the information processing apparatus 10 can input various data to the information processing apparatus 10 and can instruct the information processing apparatus 10 to perform various types of processing by operating this input device 915.

The output device 917 includes a device capable of visually or audibly notifying a user of acquired information. Such a device includes a display device such as a CRT display device, a liquid crystal display device, a plasma display device, an EL display device and a lamp, an audio output device such as a speaker and a headphone, a printer, a mobile phone, a facsimile machine and the like. For example, the output device 917 outputs a result obtained by various types of processing performed by the information processing apparatus 10. Specifically, the display device displays, in the form of text or images, a result obtained various types of processing performed by the information processing apparatus 10. On the other hand, the audio output device converts an audio signal including reproduced audio data, sound data, and the like into an analog signal, and outputs the analog signal.

The storage device 919 is a device for storing data configured as an example of a storage unit of the information processing apparatus 10. The storage device 919 includes, for example, a magnetic storage device such as a HDD (Hard Disk Drive), a semiconductor storage device, an optical storage device, a magneto-optical storage device, or the like. This storage device 919 stores programs to be executed by the CPU 901 and various types of data, externally obtained various types of data, and the like.

The drive 921 is a reader/writer for a recording medium, and is built in the information processing apparatus 10 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write records in the attached removable recording medium 927 such as a magnetic disk, an optical disc, a magneto-optical disk, or a semiconductor memory. The removable recording medium 927 is, for example, a DVD medium, an HD-DVD medium, a Blu-ray (registered trademark) medium, or the like. In addition, the removable recording medium 927 may be a CompactFlash (CF; registered trademark), a flash memory, an SD memory card (Secure Digital Memory Card), or the like. Further, the removable recording medium 927 may be, for example an IC card (Integrated Circuit Card) equipped with a non-contact IC chip, an electronic appliance, or the like.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, a High-Definition Multimedia Interface (HDMI, registered trademark) port, and the like. By connecting the external connection apparatus 929 to this connection port 923, the information processing, apparatus 10 directly acquires various types of data from the external connection apparatus 929 and provides various types of data to the external connection apparatus 929.

The communication device 925 is a communication interface including, for example, a communication device or the like for connecting to a communication network 931. The communication device 925 is, for example a communication card or the like for a wired or wireless LAN (Local Area Network), Bluetooth (registered trademark), or WUSB (Wireless USB). Further, the communication device 925 may be a router for optical communication, a router for ADSL (Asymmetric Digital Subscriber Line), a modem for various types of communication, or the like. This communication device 925 can transmit and receive signals and the like in accordance with a predetermined protocol, for example, such as TCP/IP on the Internet and with other communication devices, for example. In audition, the communication network 931 connected to the communication device 925 includes a network and the like which is connected in a wire or wireless manner and may be, for example, the Internet, a home LAN infrared communication radio wave communication satellite communication, or the like.

The above illustrates an example of the hardware configuration capable of realizing the functions of the information processing apparatus 10 according to the embodiment of the present disclosure. Each of the above structural elements may be realized using a general-purpose members, or may also be realized using hardware specialized in the function of each structural element. Consequently, it is possible to appropriately modify the hardware configuration to be used according to the technical level at the time of carrying out the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effect described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below. Here, the image searching unit described earlier corresponds to the following reading unit and searching unit.

(1)

An information processing apparatus including:
a reading unit configured to read, from a recording unit configured to record radio wave information concerning a radio wave, a captured image, and a time at which the captured image is taken in correlation with one another, the radio wave information; and
a searching unit configured to search a plurality of the captured images recorded in the recording unit for a captured image that satisfies a search condition on a basis of at least one of a number of radio waves included in the read radio wave information and an intensity of the radio waves.

(2)

The information processing apparatus according to (1), in which
the searching unit
regarding the captured image to be used as any search basis, specifies the radio wave information defected when the captured image as a search basis is generated on a basis of a time stamp correlated with the captured image and the radio wave information,
sets the search condition from a combination of the intensity and number of the radio waves included in the specified radio wave information to specify the radio wave information that matches the search condition, and
utilizing the time stamp correlated with the specified radio wave information, specifies the captured image corresponding to the time stamp.

(3)

The information processing apparatus according to (2), in which
in addition to the captured image specified on a basis of the search condition, the searching unit selects the captured images taken in a predetermined period before and after the specified captured image from among the plurality of captured images.

(4)

The information processing apparatus according to any one of (1) to (3), in which
in a case where there are a plurality of the captured images that match the search condition, the searching unit changes a display order of search results in accordance with a degree of similarity of the radio waves.

(5)

The information processing apparatus according to any one of (1) to (4), further including:
a display control unit configured to perform display control for causing the captured image found by the searching unit to be displayed on a display screen, in which
the display control unit at least provides, on the display screen, a captured image display area in which the captured image is displayed and a search condition setting area for designating the search condition, and regarding the captured image designated by a user among any of the captured images displayed in the captured image display area, causes a display object that represents the intensity and number of the radio waves included in the radio wave information corresponding to the captured image designated by the user to be displayed in the search condition setting area, and
the searching unit sets the search condition in accordance with a user operation carried out by the user in the search condition setting area.

(6)

The information, processing apparatus according to (5), in which
the display control unit
provides, on the display screen, a search result display area in which the captured image that matches the search condition is displayed as a search result and a search result detail display area in which the captured image designated by the user among captured images that match the search condition is displayed in detail, and causes captured images that match the search condition to be displayed in the search result display area by a list display or a time line display.

(7)

The information processing apparatus according to (6), in which the display control unit at least arranges thumbnail images of the captured images that match the search condition in the search result display area.

(8)

The information, processing apparatus according to (6) or (7), in which the display control unit causes an object showing an intensity pattern of the radio waves included in the radio wave information corresponding to the captured image designated by the user and a number designating object with which the number of the radio waves utilized for searching is designated to be displayed as the display object, and using the number designated with the number designating object as the search condition, the searching unit searches for the captured image in which the number of pieces of the radio wave information or more match.

(9)

The information processing apparatus according to (6) or (7) or in which the display control unit causes an object showing an intensity pattern of the radio waves included in the radio wave information corresponding to the captured image designated by the user and a combination designating object with which a combination of the radio waves is designated to be displaced as the display object, and using the combination of the radio waves designated with the combination designating object as the search condition, the searching unit searches for the captured image corresponding to the radio wave information in which the designated combination of the radio waves has been detected.

(10)

The information processing apparatus according to (6) or (7), in which the display control unit causes an intensity designating object with which a relative intensity of radio waves is designated or a separation distance designating object with which a relative separation distance from a subject to be imaged in a captured image is designated to be displayed as the display object, and using, as the search condition, the intensity of the radio waves that is included in the radio wave information corresponding to the captured image designated by the user and weighted with a weighting coefficient corresponding to the intensity designating object or the separation distance designating object, the searching unit searches for the captured image corresponding to the radio wave information having an intensity higher than or equal to the intensity after weighting or an intensity lower than or equal to the intensity after weighting.

(11)

The information processing apparatus according to (6) or (7), in which the display control unit causes an object showing an intensity pattern of the radio waves included in the radio wave information corresponding to the captured image designated by the user, a combination designating object with which a combination of the radio waves is designated, and an intensity designating object with which a relative intensity of radio waves is designated to be displayed as the display object, and using a value obtained by weighting the intensity of the radio waves included in the radio wave information corresponding to the captured image designated by the user with a weighting coefficient corresponding to the intensity designating object and the combination of the radio waves designated with the combination designating object as the search condition, the searching unit searches for the captured image corresponding to the radio wave information which has an intensity higher than or equal to the intensity after weighting or an intensity lower than or equal to the intensity after weighting and in which the designated combination of the radio waves has been detected.

(12)

The information processing apparatus according to any one of (1) to (11), in which the radio waves are radio waves utilized for wireless communication.

(13)

An information processing method including:

reading, from a recording unit configured to record radio wave information concerning a radio wave, a captured image, and a time at which the captured image is taken in correlation with one another, the radio wave information; and searching a plurality of the captured, images recorded in the recording unit for a captured image that satisfies a search condition on a basis of at least one of a number of radio waves included in the read radio wave information and an intensity of the radio waves.

(14)

A program for causing a computer to implement:

a reading function of reading, from a recording unit configured to record radio wave information concerning a radio wave, a captured image, and a time at which the captured image is taken in correlation with one another, the radio wave information; and a searching function of searching a plurality of the captured images recorded in the recording unit for a captured image that satisfies a search condition on a basis of at least one of a number of radio waves included in the read radio wave information and an intensity of the radio waves.

REFERENCE SIGNS LIST 1 surveillance camera (imaging device)
3 radio wave monitor node
10 information processing apparatus
101 data acquisition unit
103 data recording unit
105 storage unit
107 captured image reproduction unit
109 image searching unit
111 display control unit
500 display screen
501 captured image display area
503 reproduced state designating object
505 search processing starting object
507 search condition jetting area
509 search result display area
511 search result detail display area
513 pointing object
515 radio wave detection point indicating object
517 reproduced position indicating object
519 radio wave pattern display object
521 number designating object 523 combination designating object
525 threshold value designating object
527 combination-threshold value designating object

The invention claimed is:
1. An information processing apparatus comprising:
a non-transitory computer readable medium configured to record radio wave information concerning a radio wave, in association with a captured image, and a time at which the captured image is taken; and
circuitry configured to
read the radio wave information from the non-transitory computer readable medium; and
search a plurality of the captured images recorded in the non-transitory computer readable medium for a captured image that satisfies a search condition on a basis of at least one of a number of radio waves included in the read radio wave information and an intensity of the radio waves,
wherein, in a case where there are a plurality of the captured images that match the search condition, the circuitry changes a display order of search results in accordance with a degree of similarity of the radio waves.

2. The information processing apparatus according to claim 1, wherein
the circuitry
regarding the captured image to be used as any search basis, specifies the radio wave information detected when the captured image as a search basis is generated on a basis of a time stamp correlated with the captured image and the radio wave information,
sets the search condition from a combination of the intensity and number of the radio waves included in the specified radio wave information to specify the radio wave information that matches the search condition, and
by utilizing the time stamp correlated with the specified radio wave information, specifies the captured image corresponding to the time stamp.

3. The information processing apparatus according to claim 2, wherein
in addition to the captured image specified on a basis of the search condition, the circuitry selects the captured images taken in a predetermined period before and after the specified captured image from among the plurality of captured images.

4. The information processing apparatus according to claim 1, wherein the circuitry is further configured to
perform display control for causing the captured image found by the searching unit to be displayed on a display screen,
provide, on the display screen, a captured image display area in which the captured image is displayed and a search condition setting area for designating the search condition, and regarding the captured image designated by a user among any of the captured images displayed in the captured image display area, causes a display object that represents the intensity and number of the radio waves included in the radio wave information corresponding to the captured image designated by the user to be displayed in the search condition setting area, and
set the search condition in accordance with a user operation carried out by the user in the search condition setting area.

5. The information processing apparatus according to claim 4, wherein
the circuitry
provides, on the display screen, a search result display area in which the captured image that matches the search condition is displayed as a search result and a search result detail display area in which the captured image designated by the user among captured images that match the search condition is displayed in detail, and
causes captured images that match the search condition to be displayed in the search result display area by a list display or a time line display.

6. The information processing apparatus according to claim 5, wherein
the circuitry at least arranges thumbnail images of the captured images that match the search condition in the search result display area.

7. The information processing apparatus according to claim 5, wherein
the circuitry causes an object showing an intensity pattern of the radio waves included in the radio wave information corresponding to the captured image designated by the user and a number designating object with which the number of the radio waves utilized for searching is designated to be displayed as the display object, and
using the number designated with the number designating object as the search condition, the searching unit searches for the captured image in which the number of pieces of the radio wave information or more match.

8. The information processing apparatus according to claim 5, wherein
the display control unit causes an object showing an intensity pattern of the radio waves included in the radio wave information corresponding to the captured image designated by the user and a combination designating object with which a combination of the radio waves is designated to be displayed as the display object, and
by using the combination of the radio waves designated with the combination designating object as the search condition, the circuitry searches for the captured image corresponding to the radio wave information in which the designated combination of the radio waves has been detected.

9. The information processing apparatus according to claim 5, wherein
the circuitry causes an intensity designating object with which a relative intensity of radio waves is designated or a separation distance designating object with which a relative separation distance from a subject to be imaged in a captured image is designated to be displayed as the display object, and
by using, as the search condition, the intensity of the radio waves that is included in the radio wave information corresponding to the captured image designated by the user and weighted with a weighting coefficient corresponding to the intensity designating object or the separation distance designating object, the circuitry searches for the captured image corresponding to the radio wave information having an intensity higher than or equal to the intensity after weighting or an intensity lower than or equal to the intensity after weighting.

10. The information processing apparatus according to claim 5, wherein
the circuitry causes an object showing an intensity pattern of the radio waves included in the radio wave information corresponding to the captured image designated by the user, a combination designating object with which a combination of the radio waves is designated, and an intensity designating object with which a relative intensity of radio waves is designated to be displayed as the display object, and by using a value obtained by weighting the intensity of the radio waves included in the radio wave information corresponding to the captured image designated by the user with a weighting coefficient corresponding to the intensity designating object and the combination of the radio waves designated with the combination designating object as the search condition, the circuitry searches for the captured image corresponding to the radio wave information which has an intensity higher than or equal to the intensity after weighting or an intensity lower than or equal to the intensity after weighting and in which the designated combination of the radio waves has been detected.

11. The information processing apparatus according to claim 1, wherein
the radio waves are radio waves utilized for wireless communication.

12. An information processing method comprising:
reading radio wave information from a non-transitory computer readable medium, the radio wave information concerning a radio wave and being recorded in the non-transitory computer readable medium in association with a captured image, and a time at which the captured image is taken; and
searching a plurality of the captured images recorded in the non-transitory computer readable medium for a captured image that satisfies a search condition on a basis of at least one of a number of radio waves included in the read radio wave information and an intensity of the radio waves,
wherein, in a case where there are a plurality of the captured images that match the search condition, changing a display order of search results in accordance with a degree of similarity of the radio waves.

13. A non-transitory computer readable medium storing instructions which, when executed, cause a processor to perform operations comprising:
reading radio wave information from a non-transitory computer readable medium, the radio wave information concerning a radio wave and being recorded in the non-transitory computer readable medium in association with a captured image, and a time at which the captured image is taken; and
searching a plurality of the captured images recorded in the non-transitory computer readable medium for a captured image that satisfies a search condition on a basis of at least one of a number of radio waves included in the read radio wave information and an intensity of the radio waves,
wherein, in a case where there are a plurality of the captured images that match the search condition, changing a display order of search results in accordance with a degree of similarity of the radio waves.

* * * * *